(12) United States Patent
Mukhopadhyay et al.

(10) Patent No.: US 9,813,235 B2
(45) Date of Patent: Nov. 7, 2017

(54) RESISTANCE TO CACHE TIMING ATTACKS ON BLOCK CIPHER ENCRYPTION

(71) Applicant: INDIAN INSTITUTE OF TECHNOLOGY KHARAGPUR, Kharagpur (IN)

(72) Inventors: Debdeep Mukhopadhyay, Howrah (IN); Chester Dominic Rebeiro, Bangalore (IN)

(73) Assignee: INDIAN INSTITUTE OF TECHNOLOGY KHARAGPUR, Kharagpur, West Bengal (IN)

( * ) Notice: Subject to any disclaimer, the term of this patent is extended or adjusted under 35 U.S.C. 154(b) by 0 days.

(21) Appl. No.: 14/350,044

(22) PCT Filed: Apr. 25, 2013

(86) PCT No.: PCT/IB2013/053260
§ 371 (c)(1),
(2) Date: Apr. 4, 2014

(87) PCT Pub. No.: WO2014/140698
PCT Pub. Date: Sep. 18, 2014

(65) Prior Publication Data
US 2015/0249535 A1    Sep. 3, 2015

(30) Foreign Application Priority Data
Mar. 11, 2013 (IN) .............. 267/KOL/2013

(51) Int. Cl.
*H04L 29/06* (2006.01)
*H04L 9/06* (2006.01)
(Continued)

(52) U.S. Cl.
CPC .......... *H04L 9/0618* (2013.01); *G06F 21/725* (2013.01); *H04L 9/005* (2013.01);
(Continued)

(58) Field of Classification Search
CPC ....... H04L 9/0618; H04L 27/26; H04L 25/02; H04L 27/2627; H04L 27/362;
(Continued)

(56) References Cited

U.S. PATENT DOCUMENTS 7,787,620 B2    8/2010    Kocher et al.
8,549,208 B2 *  10/2013   Lee et al. .......... 711/3
(Continued)

OTHER PUBLICATIONS

Aciicmez, Onur et al., "Cache Based Remoted Timing Attack on the AES", 2007, Springer-Verlag, Berlin Heidelberg, pp. 271-286.*
(Continued)

*Primary Examiner* — Amir Mehrmanesh
*Assistant Examiner* — Sakinah Taylor
(74) *Attorney, Agent, or Firm* — Dorsey & Whitney LLP

(57) ABSTRACT

Technology is generally described for improving resistance to cache timing attacks made on block cipher encryption implementations. In some examples, the technology can include identifying one or more tunable parameters of the block cipher encryption algorithm; creating multiple encryption algorithm implementations by varying one or more of the parameter values; causing a computing system to encrypt data using the implementations; measuring average execution times at the computing system for the implementations subjecting the implementations to a cache timing attack; measuring average execution times at the computing system for the implementations subjected to a cache timing attack; computing a time difference between the average execution times for the implementations when not subjected and when subjected to a cache timing attack; selecting an implementation having a lower time difference; and using the selected implementation for a subsequent encryption operation.

17 Claims, 10 Drawing Sheets

(51) Int. Cl.
G06F 21/72 (2013.01)
H04L 9/00 (2006.01)
H04L 9/14 (2006.01)

(52) U.S. Cl.
CPC ............ *H04L 9/14* (2013.01); *H04L 2209/08* (2013.01); *H04L 2209/24* (2013.01)

(58) Field of Classification Search
CPC . H04L 27/366; H04L 5/00; H04L 5/06; H04L 5/12; H04L 9/14; H04L 9/005; H04L 9/06; G06F 21/725
USPC .......................................................... 380/28
See application file for complete search history.

(56) References Cited

U.S. PATENT DOCUMENTS

| | | | |
|---|---|---|---|
| 2004/0062391 A1* | 4/2004 | Tsunoo | G06F 12/0862 380/42 |
| 2004/0255129 A1* | 12/2004 | Henry et al. | 713/189 |
| 2005/0183072 A1 | 8/2005 | Horning et al. | |
| 2006/0184807 A1 | 8/2006 | Kocher et al. | |
| 2007/0053513 A1 | 3/2007 | Hoffberg et al. | |
| 2007/0083928 A1* | 4/2007 | Mattsson | G06F 21/552 726/22 |
| 2008/0071939 A1* | 3/2008 | Tanaka | G06F 11/3419 710/18 |
| 2009/0245510 A1 | 10/2009 | Ciet et al. | |
| 2010/0014664 A1* | 1/2010 | Shirai | H04L 9/0618 380/44 |
| 2010/0180083 A1* | 7/2010 | Lee | G06F 12/0846 711/128 |
| 2010/0250965 A1* | 9/2010 | Olson | G06F 21/602 713/190 |
| 2010/0254530 A1 | 10/2010 | Wang et al. | |
| 2011/0138192 A1 | 6/2011 | Kocher et al. | |
| 2012/0011351 A1* | 1/2012 | Mundra | G06F 21/72 713/1 |
| 2013/0145177 A1* | 6/2013 | Cordella | G06F 12/1408 713/193 |
| 2014/0286486 A1* | 9/2014 | Lee et al. | 380/28 |

OTHER PUBLICATIONS

Rebeiro, et al., "Cryptanalysis of CLEFIA Using Differential Methods with Cache Trace Patterns", Topics and Cryptology—CT-RSA 2011, vol. 6558, Feb. 14-18, 2011, pp. 89-103.
International Search Report and Written Opinion for PCT Application No. PCT/IB2013/053260mailed on Nov. 5, 2013.
Aciicmez, et al., "Cache Based Remote Timing Attack on the AES", Topics in Cryptology, vol. 4377, Aug. 2007, pp. 271-286.
Dunkelman. et al., "A Practical-Time Attack on the A5/3 Cryptosystem Used in Third Generation GSM Telephony". Proceedings of the 30th Annual Cryptology Conference, Jan. 2010, pp. 1-23.
Liu, et al., "Elimination of Side Channel attacks on a Precision Timed Architecture", Electrical Engineering and Computer Sciences University of California at Berkeley, Jan, 26, 2009, pp. 1-7.
Rebeiro, et al., "Micro-Architectural Analysis of Time-Driven Cache Attacks: Quest for the Ideal Implementation", IEEE Transactions on Computers vol. PP, Issue 99, Oct. 24, 2013, pp. 1-14.
"CLEFIA The 128-bit Blockcipher", http://web.archive.org/web/20130420142639/http://www.sony.net/Products/cryptography/clefia/, accessed on Jun. 1, 2016, pp. 2.
"PolarSSL makes it trivially easy for developers to include cryptographic and SSL/TLS capabilities in their (embedded) products, facilitating this functionality with a minimal coding footprint", accessed at http://web.archive.org/web/20130424060320/https://polarssl,org/, accessed on Jun. 1, 2016, p. 1.
"Welcome to the OpenSSL Project", accessed at http://web.archive.org/web/20130423150234/http://www.openssl.org/, accessed on Jun. 1, 2016, p. 1.

* cited by examiner

| Block Cipher | $\omega$ | $\gamma$ | $n$ | $l$ | $2^\delta$ | T-tables |
|---|---|---|---|---|---|---|
| AES | 4 | 9 | 4 | 16 | 16 | Yes |
| CAMELLIA | 4 | 18 | 2 | 4 | 64 | No |
| DES | 8 | 16 | 1 | 4 | 16 | Yes |
| CLEFIA | 2 | 18 | 4 | 4 | 64 | No |

*FIG. 3*

RESISTANCE TO CACHE TIMING ATTACKS ON BLOCK CIPHER ENCRYPTION

CROSS-REFERENCE TO RELATED APPLICATIONS

This application is a U.S. National Stage application under 35 U.S.C. 371 of International Application Number PCT/IB2013/053260, filed Apr. 25, 2013, which in turn claims priority under 35 U.S.C. 119(a) to Indian Application Number 267/KOL/2013, filed Mar. 11, 2013, the contents of which are hereby incorporated by reference for any purpose in their entirety.

BACKGROUND

Block ciphers are algorithms that transform a specified-length block of plaintext input bits into another block of ciphertext output bits (or vice versa) deterministically based on a secret encryption key, and are typically used in various cryptographic systems or protocols. Examples of protocols that use block ciphers are the Data Encryption Standard (DES), the Advanced Encryption Standard (AES). CLEFIA (named after the French word "clef" meaning "key"), and Camellia, among many others.

Popular block ciphers have been implemented using various computer programming languages and are run in many computing environments. Block ciphers commonly encrypt input plaintext into encrypted output by performing one or more transformations (e.g., substitution or permutation) in a series of iterations ("rounds"). Some implementations of block ciphers employ lookup tables of computed values instead of or in addition to transformations to speed performance. The implementation details of a block cipher, along with the characteristics of the block cipher's design, can affect both its performance and its cryptographic security.

Cryptographers routinely analyze such block ciphers for vulnerabilities that could reveal information about the secret key in less time than a brute force attack. Discovery of the secret key—or portions of it—can compromise the encryption. Attempts to gain information about the secret key by focusing on the implementation of a block cipher are called side channel attacks. Cache timing attacks are a kind of side channel attack that can be effective against implementations of block ciphers that employ lookup tables of computed values.

Cache timing attacks take advantage of computing architectures that use a processor cache, which is a relatively small data storage region often located close to the computer's processor. Reading data from a cache is much faster than reading from main memory. Information read from main memory—such as lookup table data—is temporarily held in the processor cache, thereby providing quick access during the block cipher encryption algorithm. When the processor requests lookup table data that is already in the cache (a "cache hit" or "collision"), the processor's performance is generally better than when the processor requests lookup table data that is not in the cache (a "cache miss"). After a cache miss, the processor transfers the requested data from main memory to the cache, replacing other data stored in the caches but not recently used. Different processor architectures may have, e.g., caches of different total size, line size, and associativity; different replacement policies; and/or more than one level of hierarchical cache. In various computing architectures, caches may be shared by more than one processor.

Cache timing attacks manipulate or measure the contents of a shared memory cache to determine or affect the timing of lookups during an encryption operation or a series of encryption operations. For example, it typically takes longer for data to be retrieved from main memory than from the cache. Thus, if an attacker can carefully observe and analyze an encryption operation (e.g., the time required to encrypt a particular plaintext, or the effect on encryption time of evicting certain data from the cache), the attacker may be able to deduce information about the key being used. Cloud computing systems having virtual machines running on shared hardware provide a potential avenue for such attacks. Such attacks pose a significant concern because they do not require sophisticated equipment and do not require the attacker's physical proximity, thereby facilitating remote attacks that the victim may be unable to detect.

Previously proposed approaches to blunt the effectiveness of side channel attacks include modifications to processor hardware, changing a block cipher's requirements, slowing down all block cipher lookup operations to hide the differences between cache hits and cache misses, and not using lookup tables larger than one cache line (e.g., 64 bytes). It remains a challenge, however, to find a more universal approach to reduce exposure of block ciphers and processor architectures to cache timing attacks that does not require the redesign of either the block ciphers or the processor architectures and that does not necessarily entail a performance penalty.

Unless otherwise indicated herein, the materials described in this section are not prior art to the claims in this application and are not admitted to be prior art by inclusion in this section.

SUMMARY

Technology is generally described for improving resistance to cache timing attacks made on block cipher encryption implementations. In various embodiments, the technology includes identifying one or more tunable parameters of the block cipher encryption algorithm; creating multiple encryption algorithm implementations by varying one or more of the parameter values; causing a computing system to encrypt data using the implementations; measuring average execution times at the computing system for the implementations; subjecting the implementations to a cache timing attack; measuring average execution times at the computing system for the implementations subjected to a cache timing attack; computing a time difference between the average execution times for the implementations when not subjected and when subjected to a cache timing attack; selecting an implementation having a lower time difference; and using the selected implementation for a subsequent encryption operation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 3 is a table diagram illustrating standard memory access parameters for four block ciphers.

DETAILED DESCRIPTION

Figure 1:
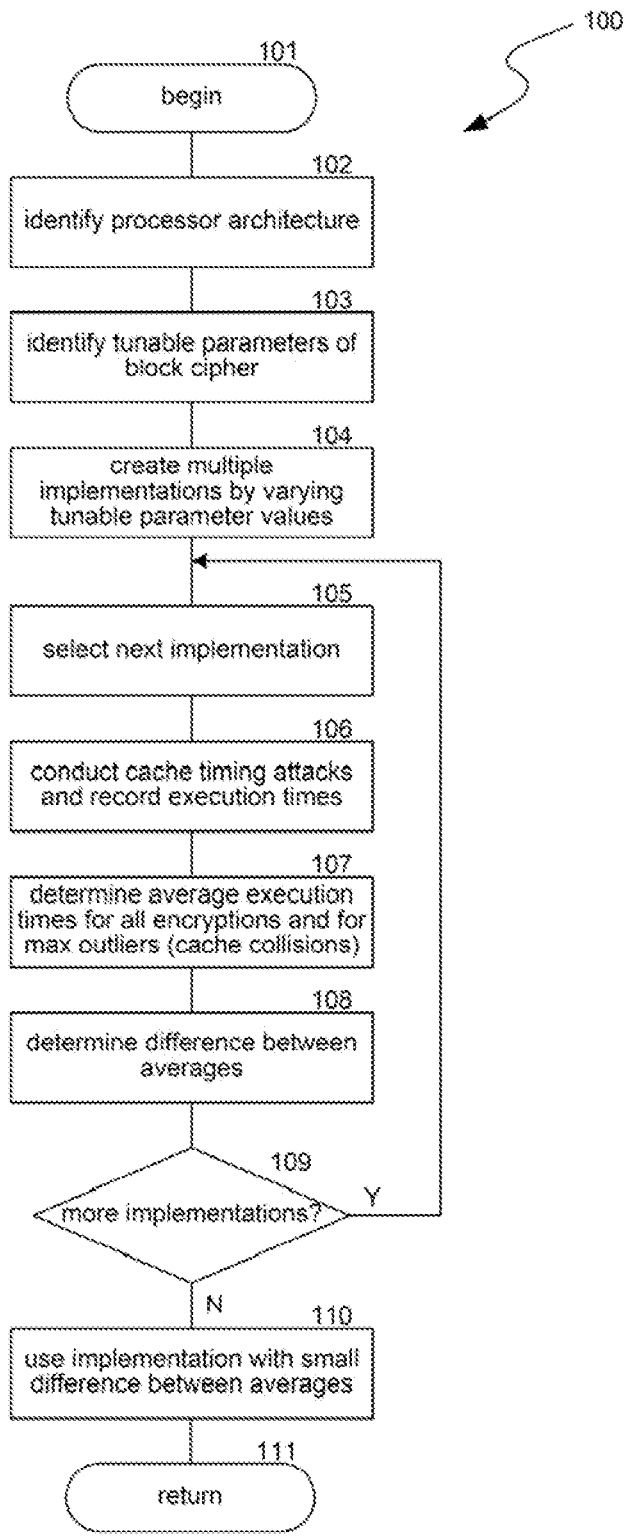
FIG. 1 is a flow diagram illustrating a routine performed by some embodiments of the technology to identify a cache timing attack-resistant implementation of a block cipher encryption algorithm.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Technology is generally disclosed for improving resistance to cache timing attacks made on block cipher encryption implementations ("timing attack resistance system" or "the technology"). The technology takes advantage of advances in modern processor caches and identifies modifiable parameters for implementing block ciphers that can be utilized to minimize the ability of cache timing attacks to reveal information about a secret key.

One major source of information leakage in cache timing attacks is a block cipher's use of lookup tables, because when portions of the lookup table are loaded into the processor cache, the speed of the encryption is affected by the differences in time for cache hits and misses (a cache "miss penalty"). In modern processor caches, micro-architectural acceleration enhancements can reduce the cache miss penalty; such enhancements include, for example, prefetching, pipelining, parallelism, non-blocking and out-of-order servicing of cache misses in various processor architectures. Such enhancements can have noticeable effects on encryption times, and thus can themselves be a source of information leakage.

In various embodiments, the technology determines, for a particular implementation of a given block cipher on a specific processor architecture, the combined effects of the processor architecture's micro-architectural cache acceleration enhancements that affect the cache miss penalty together with the number of cache misses that characterize the particular block cipher implementation on that processor architecture. The technology provides a way to reduce those combined effects and therefore to reduce the effectiveness of cache timing attacks that rely on the size of such effects. For example, a typical non-profiled cache timing attack is a chosen plaintext attack, in which the attacker methodically chooses data to encrypt and watches for, e.g., a reduced encryption time revealing a cache hit for the selected data. Evidence of such a cache hit or collision potentially indicates a special relationship between some bits of the secret key that correspond to the chosen bits of the plaintext. For example, consider an illustrative block cipher that accesses one or more lookup tables at the index $(p_a \oplus k_n)$ where $p_a$ are the nth plaintext bits, $k_n$ are corresponding key bits, and the $\oplus$ denotes exclusive-or. For plaintext bits $p_a$ and $p_b$, and corresponding key bits $k_a$ and $k_b$, the relationship revealed by a cache hit is $(p_a \oplus p_b) = \langle k_a \oplus k_b \rangle$, where the angle brackets $\langle \rangle$ indicate discarding low bits that denote memory positions within one cache line. By timing a large number of encryption operations for each combination of plaintext bits, an attacker can deduce a significant amount of information about the secret key. An approach to such an attack is described in further detail below in connection with FIG. 4.

In the example above, the attacker relies on the difference between the average time for an encryption operation and the encryption time with the greatest difference from that average to distinguish when there is a cache collision with a particular implementation of a given block cipher on a specific processor architecture. After conducting a series of encryption operations, the attacker can compare the overall encryption time average ("mean") against the encryption time average for probable cache collisions and use the difference of means to more reliably glean information about the bits of the secret key. The ability to distinguish collisions from the average case increases with the square of that difference of means. The smaller the difference of means, on the other hand, the more difficult it is for the attacker to identify cache collisions and gain secret information. If the difference is zero, the implementation of the block cipher on that processor architecture leaks no information about the secret key to that cache timing attack. Such an implementation resists cache timing attacks without needing specialized hardware, redesigned algorithms, or performance-reducing countermeasures. The technology recognizes that the effects of cache misses and of micro-architectural cache acceleration enhancements can offset one another, and identifies one or more implementations of a given block cipher for a given processor architecture that provide improved resistance to cache timing attacks.

Several embodiments of the technology are described in more detail below in reference to the Figures. FIG. 1 is a flow diagram illustrating a routine 100 performed by some embodiments of the technology to identify a cache timing attack-resistant implementation of a chosen block cipher encryption algorithm. The routine 100 begins at block 101 and continues at block 102. At block 102, the routine 100 identifies a processor architecture that will execute the block cipher implementation. Identifying the processor architecture can include, e.g., obtaining processor and cache information from an operating system or a hypervisor associated with the computing system. It can also include performing tests or other operations to determine the characteristics of the processor architecture. One example of performing such a determination is described in further detail below in connection with FIG. 9.

Returning to FIG. 1, the routine 100 continues at block 103, where it identifies tunable memory access parameters of the block cipher. Such parameters may include, e.g.:

| | |
|---|---|
| ω | Number of equally sized tables used in the implementation |
| γ | Number of rounds (iterations) in the cipher |
| n | Number of key-related lookups per table per round |
| l | Number of memory blocks required to hold a table (table size) |
| $2^\delta$ | Number of table elements sharing a cache line (line size/element size) |
| T-tables | Whether lookup tables incorporate permutation (diffusion) as well as substitution |

Not all such parameters may be tunable for a particular combination of processor architecture and block cipher. For example, the number of table elements that fit in one cache line (represented by the symbol $2^\delta$) can depend on the size of each table element, which may be fixed by the specification of a particular block cipher, and on the length of a cache line, which is generally fixed for a particular cache of a particular processor architecture. Within such constraints, the technology can create multiple implementations of a block cipher by varying one or more parameter at a time. For example, if a block cipher requires at least ten rounds for a particular key size, and one implementation of that block cipher iterates for ten rounds ($\gamma=10$), another implementation might iterate for twelve rounds ($\gamma=12$). For another example, if one implementation of a block cipher employs four 256-element tables ($\omega=4$, $l=256/2^\delta$), another implementation might employ one 1024-element table ($\omega=1$, $l=1024/2^\delta$), and yet another might employ eight 128-element tables ($\omega=8$, $l=128/2^\delta$). In some embodiments, the technology creates such varying implementations by, e.g., calling program code that generates a generic block cipher routine for execution on a particular processor architecture or programming environment. Calling such program code with different parameter values, for example, or modifying one or more variables within such program code, generates a block cipher routine having different memory access parameter values. Examples of multiple implementations of a block cipher with varying parameter values are described in further detail below in connection with FIG. 7.

The routine 100 continues at block 104, where it creates multiple implementations of the block cipher, each with varying combinations of values of the tunable parameters. The routine 100 continues at block 105, where it selects a block cipher implementation in preparation for iterating through each created implementation to test each selected implementation for potential resistance to cache timing attacks.

The routine 100 continues at block 106, where it conducts cache timing attacks on encryption operations performed by a created implementation. In some embodiments, such attacks may be structured as described above and described in further detail below in connection with FIG. 4. The technology records the execution time for each encryption operation. By performing a series of such timed encryption operations, the technology can obtain statistical data about the performance of the block cipher implementation in the face of various inputs or attacks. The routine 100 continues at block 107, where it determines an average execution time (e.g., a mean or median execution time for all encryptions) and an average execution time for encryption operations that had unusually short or long encryption times (e.g., a mean or median execution time for outlier encryptions). The routine 100 continues at block 108, where it records the difference (or magnitude of absolute value difference) between the average times determined at block 107. The difference between those averages may be related to that implementation's vulnerability to cache timing attacks on that processor architecture. The routine 100 continues at decision block 109, where it determines if there are more implementations to test. If there are more implementations, the routine 100 continues at block 105 where it selects a next implementation.

Otherwise, the routine 100 continues at block 110, where it identifies an implementation with a small difference of averages as an implementation with improved resistance to a cache timing attack. Depending on the overall performance of one or more implementations identified as having such resistance, the technology may provide for use of an implementation with a relatively high resistance to cache timing attacks and a low average encryption time rather than, e.g., an implementation with the highest resistance to cache timing attacks and a high average encryption time. The routine 100 continues at block 111, where it returns.

Those skilled in the art will appreciate that the logic illustrated in FIG. 1 and described above, and in each of the flow diagrams discussed below, may be altered in various ways. For example, the order of the logic may be rearranged, substeps may be performed in parallel, illustrated logic may be omitted, other logic may be included, etc.

Figure 2:
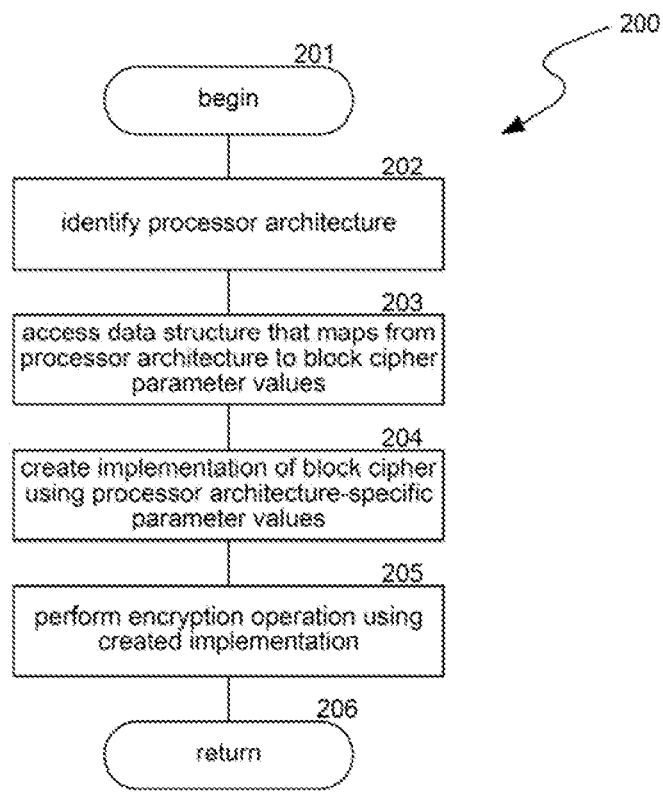
FIG. 2 is a flow diagram illustrating a routine performed by some embodiments of the technology to select an implementation of a block cipher encryption algorithm for a processor architecture.

FIG. 2 is a flow diagram illustrating a routine 200 performed by some embodiments of the technology to select an implementation of a chosen block cipher encryption algorithm for a processor architecture. The routine 200 begins at block 201. The routine 200 continues at block 202, where it identifies a processor architecture that will execute the block cipher implementation, as described above in connection with block 102 of FIG. 1 (e.g., through obtaining processor and cache information from an operating system or hypervisor, or through characterizing the operation of the processor architecture). The routine 200 continues at block 203, where it accesses a data structure that maps from one or more processor architectures (identified at block 202) to values for parameters of the chosen block cipher that can be tuned for implementation on the processor architecture. In some embodiments, such a data structure storing parameters and parameter values for various combinations of block ciphers and processor architectures is populated as a result of performing a routine such as that described in FIG. 1 above.

The routine 200 continues at block 204, where it creates an implementation of the chosen block cipher in accordance with the parameter values specified by the data structure for the relevant processor architecture. Creation of such an implementation is described in further detail above in connection with FIG. 1. The routine 200 continues at block 205, where it performs an encryption operation (e.g., encryption or decryption) using the created implementation. The routine 200 continues at block 206, where it returns.

FIG. 3 is a table diagram illustrating standard memory access parameters for four block ciphers according to a typical, default, or reference implementation. Table 300 contains columns 301-307 and rows 311-314. Column 301 lists the names of four block ciphers: AES (row 311), *Camellia* (row 312), DES (row 313), and CLEFIA (row 314). Column 302 represents the parameter ω, which is the number of equal-size tables accessed by the implementation of each of the four block ciphers in rows 311-314. Column 303 lists values for the parameter γ, which is the number of iterative rounds for the implementation of each block cipher. Column 304 lists values for the parameter n, which is the number of key-related lookups per table per round for the implementation of each block cipher. Column 305 lists values for the parameter l, which is the number of memory blocks required to hold each of the of tables (e.g., the size of each table) for the implementation of each block cipher. Column 306 lists values for the parameter $2^\delta$, which is the number of table elements that fit into a cache line for the implementation of each block cipher on a processing architecture with an assumed cache line size of 64 bytes. With that assumption, the size of each of a block cipher's ω tables is (64*l) bytes, and the number of elements in each such table is ($2^\delta$*l). Column 307 lists whether the implementation employs T-tables that subsume more than just substitution lookups.

For example, row 311 indicates that the AES block cipher employs 4 equally sized tables, iterates for 9 rounds, performs 4 lookup operations per round, uses tables that each require 16 64-byte memory blocks (1024 bytes each), fits 16 table elements in a 64-byte cache line (4-byte table elements), and uses T-tables that combine multiple block cipher steps into one lookup operation (each of the four tables contains 256 4-byte values). The row 311 AES information is based on OpenSSL 0.9.8a. AES additionally includes a final, partial tenth round that uses a different fifth table. The row 312 Camellia and row 313 DES data are based on PolarSSL 1.1.1; and the row 314 CLEFIA data are based on Sony®'s Reference Code 1.0.0.

While FIG. 3 shows a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

Figure 4:
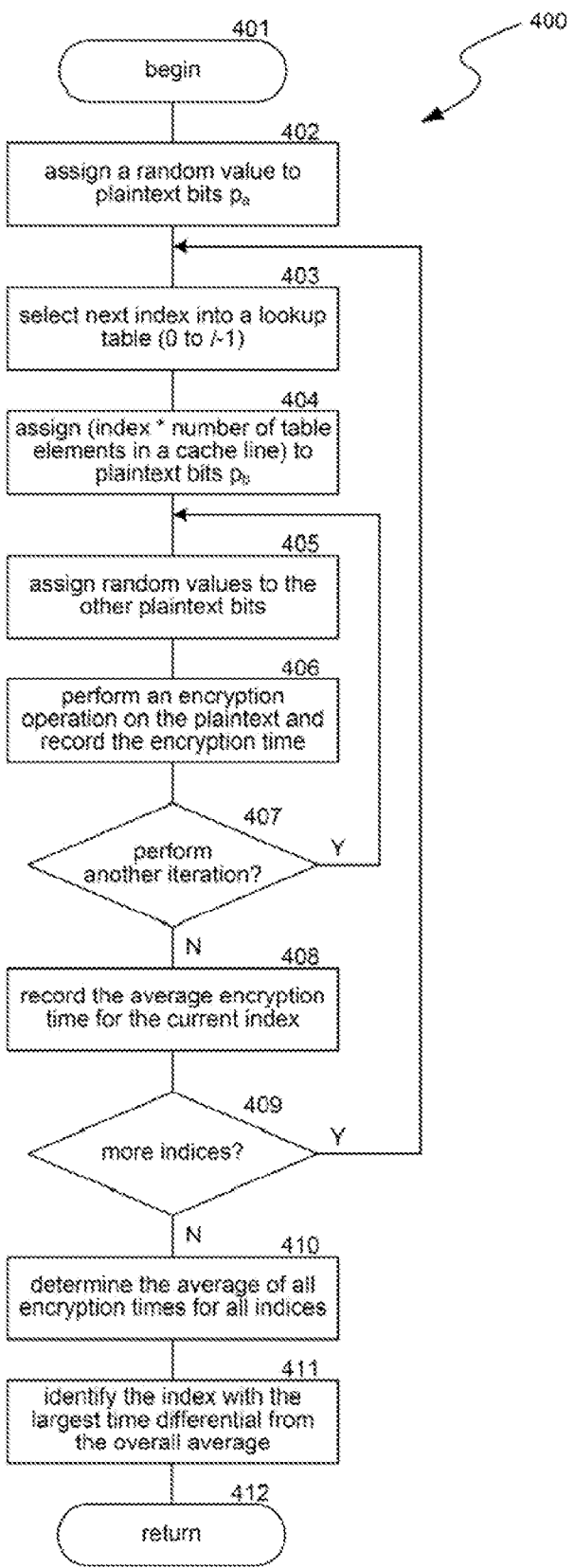
FIG. 4 is a flow diagram illustrating a routine performed by some embodiments of the technology to subject a block cipher to a timing attack.

FIG. 4 is a flow diagram illustrating a routine 400 performed by some embodiments of the technology to subject a block cipher to a timing attack. The routine 400 is based on an illustrative block cipher that accesses one or more lookup tables at the index ($p_b \oplus k_b$) as described above. The routine 400 begins at block 401. The routine 400 continues at block 402, where it assigns a random value to a set of plaintext bits $p_a$, and holds that value constant while varying other bit values. The routine 400 continues at block 403, where it selects an index from 0 to (l−1), i.e., each possible index into a lookup table with l entries. The routine 400 continues at block 404, where it assigns to a set of plaintext bits $p_b$ the product of the current index value multiplied by $2^\delta$. As the routine loops through all its index values, the block cipher will access every possible memory block via index ($p_b \oplus k_b$), and thus at some point result in a cache hit after index ($p_a \oplus k_a$) has been loaded into the cache, affecting the timing of the encryption operation.

The routine 400 continues at block 405, the routine 400 then loops for a large number of repetitions to obtain sufficient data to clearly identify outlier timing values, e.g., timings attributable to cache collisions. The routine 400 continues at block 406, where it assigns random values to the rest of the bits of the plaintext to be encrypted (e.g., all the bits other than $p_a$ set at block 402 and $p_b$ set at block 404). The routine 400 continues at block 407, where it causes the block cipher to perform an encryption operation on the chosen plaintext bits and records how much time the operation required. The routine 400 continues at decision block 408, where it determines if a large number of iterations have completed.

Otherwise, the routine 400 continues at block 409, where it records the average encryption time over the large number of repetitions performed for the current index value. The routine 400 continues at decision block 410, where it determines if there are more indices into the lookup table. If there are more indices, the routine 400 continues at block 403. Otherwise, the routine 400 continues at block 411. Once encryption operations have been timed for each index value, the routine 400 at block 411 determines the average encryption time for all indices. The routine 400 continues at block 412, where it compares the average encryption time for each index value with the overall average encryption time for all indices, and identifies the index with the largest differential from the overall average. As described above, for that index an attacker can deduce that a cache collision occurred, meaning that $<p_a \oplus k_a> = <p_b \oplus k_b>$, and therefore (equivalently) that $<p_a \oplus p_b> = <k_a \oplus k_b>$. Because the quantity $p_a \oplus p_b$ is known (with $p_a$ chosen at block 402 and $p_b$ chosen at block 404), this attack, if successful, reveals some information about the secret key.

Figure 5A:
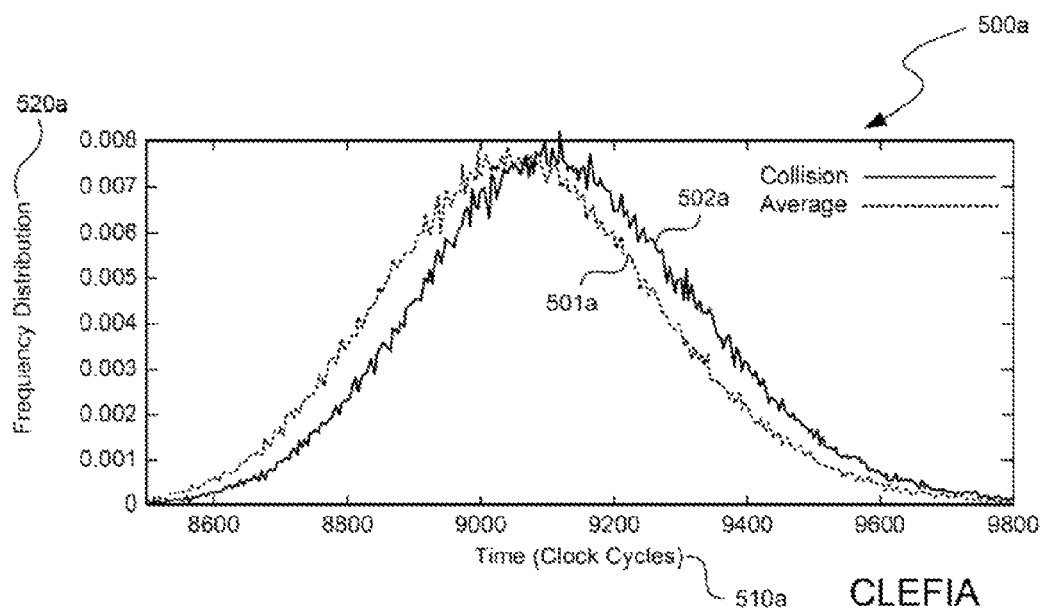
FIGS. 5A and 5B are graph diagrams illustrating mean timing differences caused by cache timing attacks.
Figure 5B:
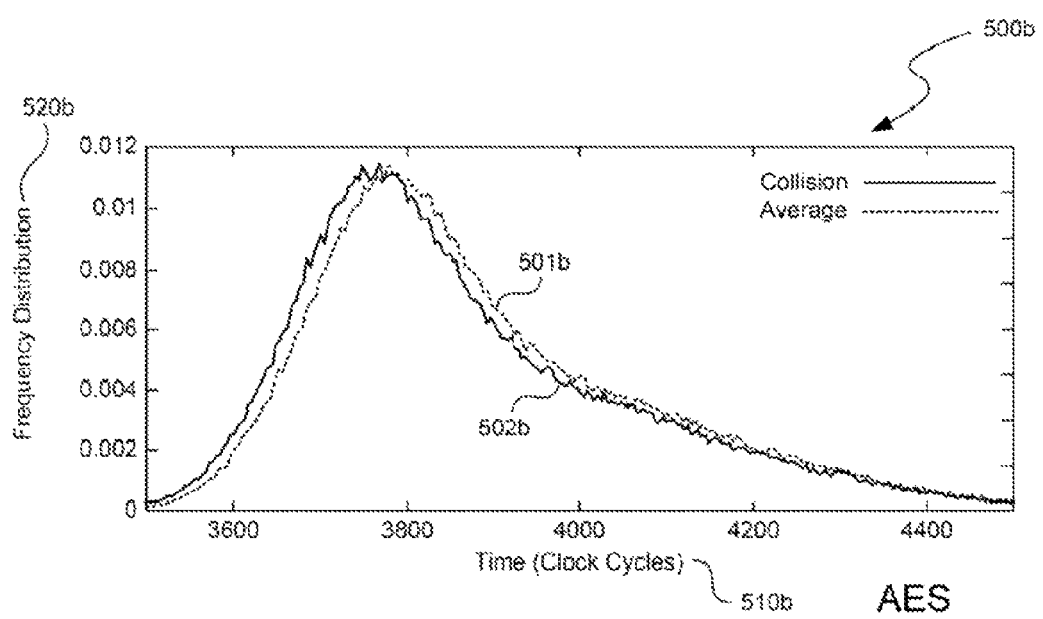

FIGS. 5A and 5B are graph diagrams illustrating mean timing differences caused by cache timing attacks. The data the graphs illustrate can be the result of successful attacks performed according to the routine described above in connection with FIG. 4. FIG. 5A has graph 500a illustrating a frequency distribution plot of a large number of encryption timing measurements for an implementation of the CLEFIA block cipher. The horizontal axis 510a indicates elapsed encryption time and the vertical axis 520a indicates the frequency that a given timing occurred. Plot line 501a illustrates a frequency distribution for average encryption times, and plot line 502a illustrates a frequency distribution for encryption times associated with a cache collision. In graph 500a, the difference between the means of the two distributions is positive: cache collisions resulted in increased encryption time.

FIG. 5B has graph 500b illustrating a frequency distribution plot of a large number of encryption timing measurements for an implementation of the AES block cipher. The horizontal axis 510b indicates elapsed encryption time and the vertical axis 520b indicates the frequency that a given timing occurred (not on the same scales as in Figure SA). Plot line 501b illustrates a frequency distribution for average encryption times, and plot line 502b illustrates a frequency distribution for encryption times associated with a cache collision. In graph 500b, the difference between the means of the two distributions is negative: cache collisions resulted in decreased encryption time. In both FIGS. 5A and 5B, the clear differences between the means of the distributions indicate that their corresponding block cipher implementations are vulnerable to cache timing attacks because timing differences can be distinguished.

Figure 6A:
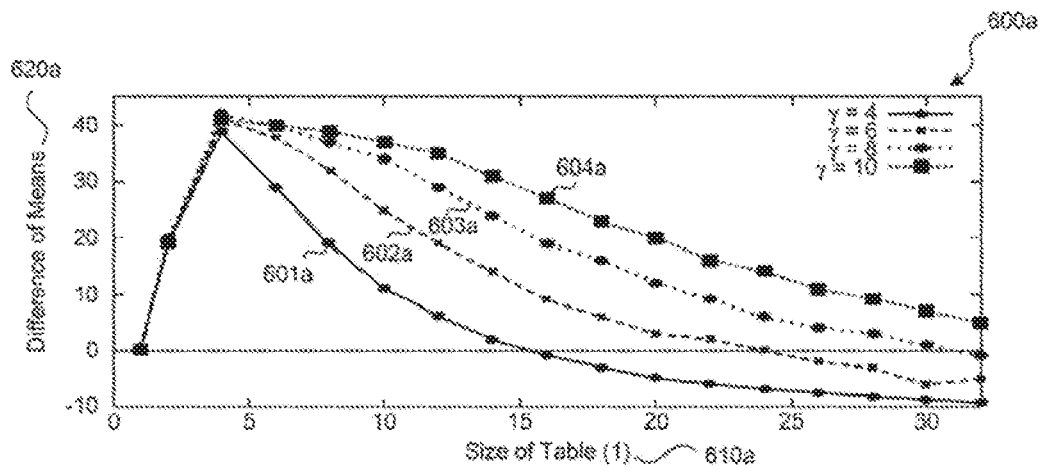
FIGS. 6A-6C are graph diagrams illustrating how varying tunable block cipher parameters can affect the mean timing difference caused by a cache timing attack.
Figure 6B:
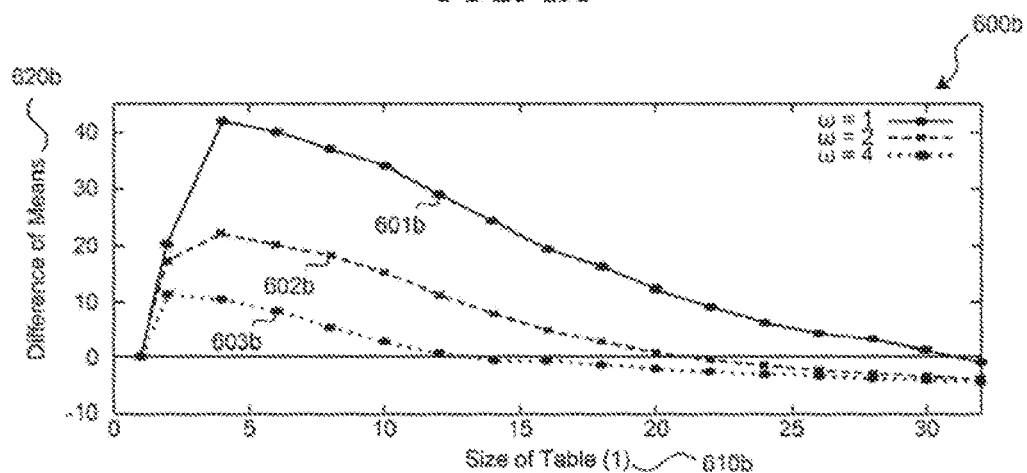
Figure 6C:
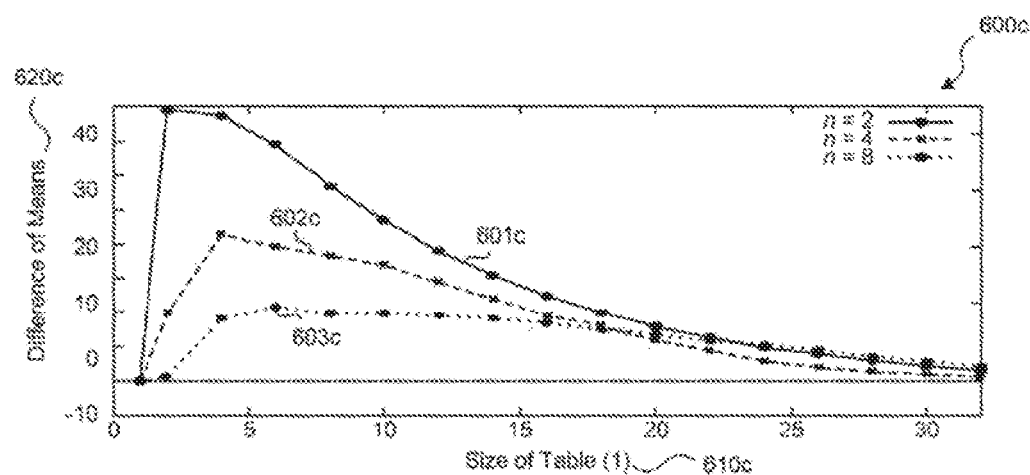

FIGS. 6A-6C are graph diagrams illustrating how varying tunable block cipher parameters can affect the mean timing difference caused by a cache timing attack. Each of graphs 600a (FIG. 6A). 600b (FIG. 6B), and 600c (FIG. 6C) plots the effect of varying table sizes (l) on the mean encryption time differences revealed by cache timing attacks. Each graph is characterized by data points with a zero difference of means for table sizes (l) that equal one cache line. When l=1, there is no information leakage to cache timing attacks, because in every encryption the first access loads the entire table into the processor cache and all subsequent memory accesses result in cache hits. With exactly one cache miss per encryption operation (preceding the initial table load), cache timing attacks have no effect. However, limiting table sizes to one cache line may also limit performance, making average encryption times significantly slower. FIGS. 6A-6C illustrate, however, that for a given block cipher and processor architecture, some choices of tunable parameter values that include larger table sizes may provide a block cipher implementation that is highly resistant to cache timing attacks.

FIG. 6A illustrates how varying table sizes (horizontal axis 610a) could affect the difference of means (vertical axis 620a) for implementations of a block cipher that iterate for different numbers of rounds ($\gamma$) on a particular processor architecture. In each implementation, the number of tables ($\omega$) is held constant at 1, and the number of table lookups per round (n) is held constant at 4. For example, plot 601a indicates that when the block cipher implementation iterates for 4 rounds, an ideal table size l to resist cache timing attacks is approximately 15 memory blocks, and plot 603a indicates that when the block cipher implementation iterates for 8 rounds, an ideal table size l to resist cache timing attacks is approximately 31 memory blocks.

FIG. 6B illustrates how varying table sizes (horizontal axis 610b) could affect the difference of means (vertical axis 620b) for implementations of a block cipher that use different numbers of equal-size tables ($\omega$) on a particular processor architecture. In each implementation, the number of rounds ($\gamma$) is held constant at 8, and the number of table lookups per round (n) is held constant at 4. For example, plot 601b indicates that when the block cipher implementation uses a single table, an ideal table size l to resist cache timing attacks is approximately 31 memory blocks, and plot 603b indicates that when the block cipher implementation uses four tables, an ideal table size l to resist cache timing attacks is approximately 12-16 memory blocks.

FIG. 6C illustrates how varying table sizes (horizontal axis 610c) could affect the difference of means (vertical axis 620c) for implementations of a block cipher that make different numbers of table accesses per round (n) on a particular processor architecture. In each implementation, the number of tables ($\omega$) is held constant at 1, and the number of rounds ($\gamma$) is held constant at 8. For example, plots 601c, 602c, and 603c indicate that whether the number of table accesses per round is 2, 4, or 8, an ideal table size l to resist cache timing attacks for those implementations is at least 32 memory blocks.

In general, holding other parameters steady, the ideal size of a lookup table is proportional to the number of rounds in the cipher and inversely proportional to the number of tables used in the implementation and the number of accesses to the tables made in each round. When the table size l is smaller than ideal, the number of cache misses is constant and the effects of micro-architectural acceleration enhancements dominate the difference of averages, resulting in a positive difference as seen with CLEFIA in Figure SA. When the table size l is larger than ideal, the effect of the number of cache misses dominates the effects of micro-architectural acceleration enhancements, resulting in a negative difference of averages as seen with AES in FIG. 5B.

Figure 7:
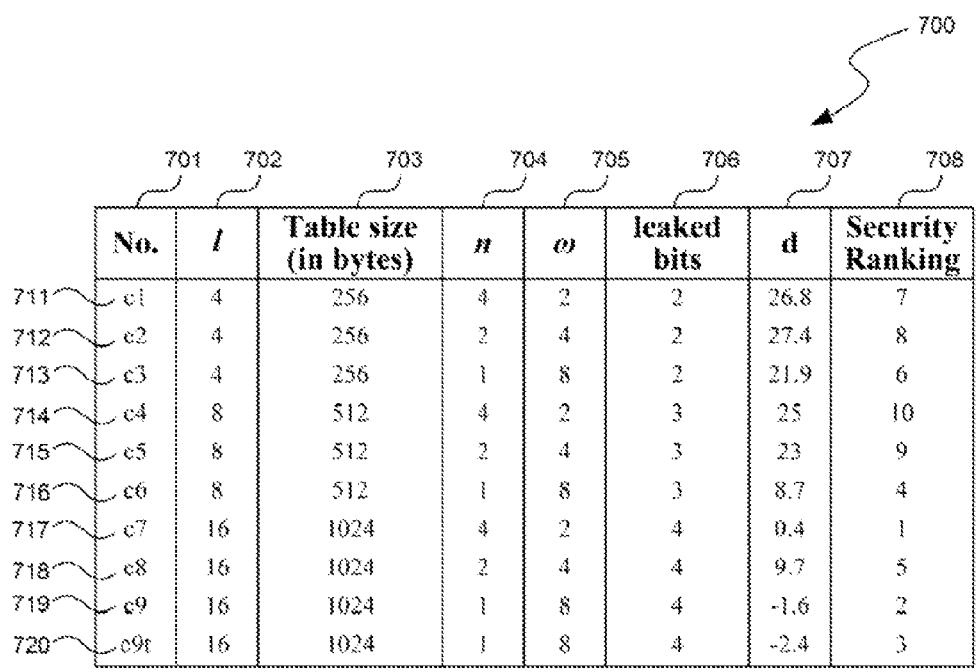
FIG. 7 is a table diagram illustrating implementation results of varying tunable parameters of an example block cipher.

FIG. 7 is a table diagram illustrating implementation results of varying tunable parameters of an example block cipher. In the illustrated example, the block cipher is CLEFIA modeled on an Intel Xeon processor (with an assumed cache line size of 64 bytes). Table 700 includes columns 701-708 describing the parameters of the ten implementations of CLEFIA listed in rows 711-720. For each of the ten modeled implementations, column 701 lists the implementation identifiers, column 702 lists table size in memory blocks (l), column 703 lists table size in bytes (l*64), column 704 lists the number of table accesses per round (n), column 705 lists the number of tables ($\omega$), column 706 lists the number of bits that could be leaked by a successful cache timing attack, column 707 lists the difference of averages, and column 708 ranks the relative resistance of the ten implementations to a cache timing attack (determined by the formula ($1/(d^2*$leaked bits))).

In this example, some parameters are not treated as tunable. Specifically, the number of table elements that will fit in a cache line ($2^\delta$) is fixed at 64, because the cache line size is fixed for a given processor architecture and CLEFIA specifies one byte per table entry; and the number of rounds ($\gamma$) is held fixed at 18 according to the CLEFIA block cipher specification. Tunable parameters may be constrained; e.g., table size will generally be a power of 2, while the number of tables ($\omega$) and number of lookups per table per round (n) are generally multiplicatively interdependent.

For example, row 711, which corresponds to the CLEFIA reference implementation, numbered c1, has a table size of 4 cache lines or 256 bytes, with 4 lookups per round into 2 tables. Due to the table size, a successful cache timing attack on implementation c1 would leak 2 bits of information about the secret key. The difference of averages for implementation c1 is 26.8, and its security ranking is 7th out of 10. By contrast, row 720, which corresponds to an implementation of CLEFIA with T-tables, numbered c9t, has a table size of 16 cache lines or 1024 bytes, with 1 lookup per round into each of 8 tables. Due to the table size, a successful cache timing attack on implementation c9t would leak 4 bits of information about the secret key. The difference of averages for implementation c9t is −2.4 (about a tenth of the magnitude of difference for implementation c1), and its security ranking is 3rd out of 10.

Figure 8:
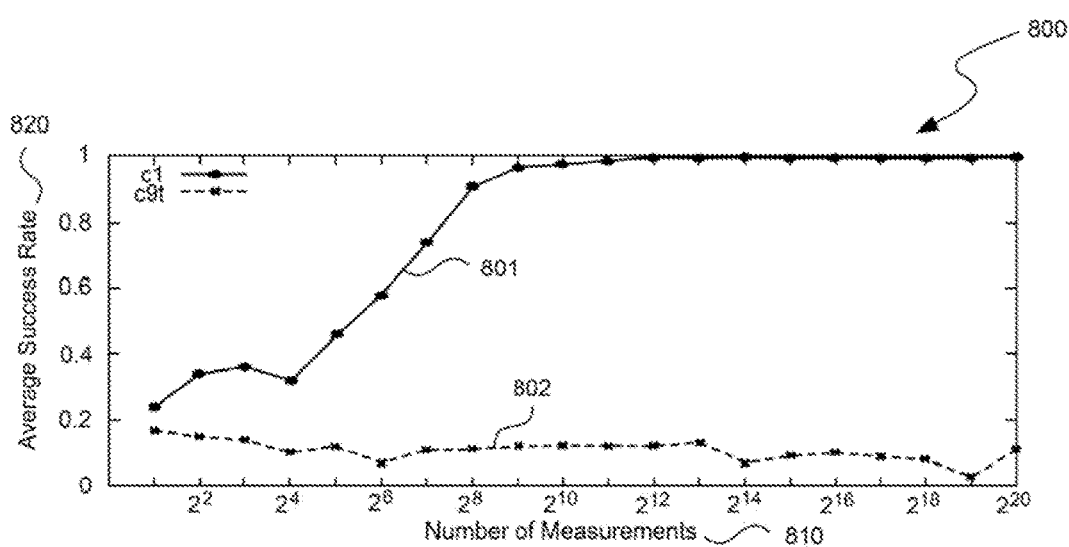
FIG. 8 is a graph diagram illustrating relative success rates of cache timing attacks on different implementations of an example block cipher.

FIG. 8 is a graph diagram illustrating relative success rates of cache timing attacks on different implementations of an example block cipher. In the illustrated example, the block cipher is CLEFIA modeled on an Intel Xeon processor, as described in further detail in connection with FIG. 7. FIG. 8 contains graph 800 illustrating two plots of average success rates for cache timing attacks against modeled implementations of the CLEFIA block cipher. The horizontal axis 810 indicates the number of measurements taken (from 1 to approximately 1 million, increasing exponentially) and the vertical axis 820 indicates the average success rate of 100 cache timing attacks. Success of one attack such as that described in connection with FIG. 4 is defined as whether the attack correctly determines the relationship $<p_a \oplus p_b>=<k_a \oplus k_b>$ and therefore reveals information about the secret key. Plot line 801 illustrates that for the reference implementation of CLEFIA 711 (implementation c1 as described in connection with FIG. 7), attacks have an average success rate above 95% after only 500 measurements. Plot line 802 illustrates that for implementation c9t of CLEFIA 720 (as described in connection with FIG. 7), attacks have an average success rate below 20% even after 1,000,000 measurements. Thus, implementation c9t 720 is significantly more resistant to cache timing attacks than implementation c1 711.

In accordance with FIG. 7, implementations c7 717 and c9 719 might be expected to be even more resistant to cache timing attacks than implementation c9t 720. An additional advantage of implementation c9t 720 is that, in large part because of its use of T-tables, its average encryption time was approximately 4000 clock cycles as opposed to 9000 clock cycles for implementation c1 711. Thus, in addition to improved resistance to cache timing attacks, implementation c9t 720 provided performance approximately twice as fast as the reference implementation. The technology would indicate use of implementation c9t 720 above implementation c1 711 for this combination of block cipher and processor architecture. The technology could indicate use of implementation c9t 720 above implementations c7 717 and/or c9 719 depending on the desired combination of performance and cache timing attack resistance.

In some embodiments, identifying a processor architecture is accomplished by experimentally determining the operational characteristics of the processor architecture. In some embodiments, the technology identities a processor architecture by determining the size of the cache miss penalty for related or unrelated data. The time required to execute m cache misses can be characterized as $(\alpha+\beta*m)$, where the constant $\alpha$ represents the initial latency for the first cache miss and $\beta$ represents the time required to service a cache miss.

In processor caches enhanced with micro-architectural acceleration features, memory accesses can be parallelized, pipelined, and performed in non-blocking and out-of-order fashion. Parallelization and pipelining allow multiple cache misses to be serviced simultaneously, while out-of-order loading allows memory accesses to be performed in a sequence not strictly specified by the program. Non-blocking memory accesses allow other memory accesses to be done while a cache miss is being serviced. These acceleration techniques are more effective where data accessed is unrelated or independent. Where one data access is related to another, e.g., dependent on an immediately preceding data access, such acceleration techniques are less effective at reducing a cache miss penalty.

The total time required for servicing cache misses in the cipher is the sum of the time required for servicing cache misses in each round. In a typical iterative block cipher implementation, each round has several memory accesses, which ideally access random unrelated indices in the tables. Because the output of each round is used in the input of following rounds, however, the lookup table data accessed in following rounds is dependent on the previous rounds' accesses. This general pattern of memory accesses shows that in an illustrative block cipher, cache misses within a single round can be accelerated due to the parallelism, pipelining, and out-of-order features in the cache (affecting fi, the time required to service cache misses), while cache misses across rounds must be performed sequentially due to the data dependencies (affecting a, the latency for a first cache miss).

Figure 9:
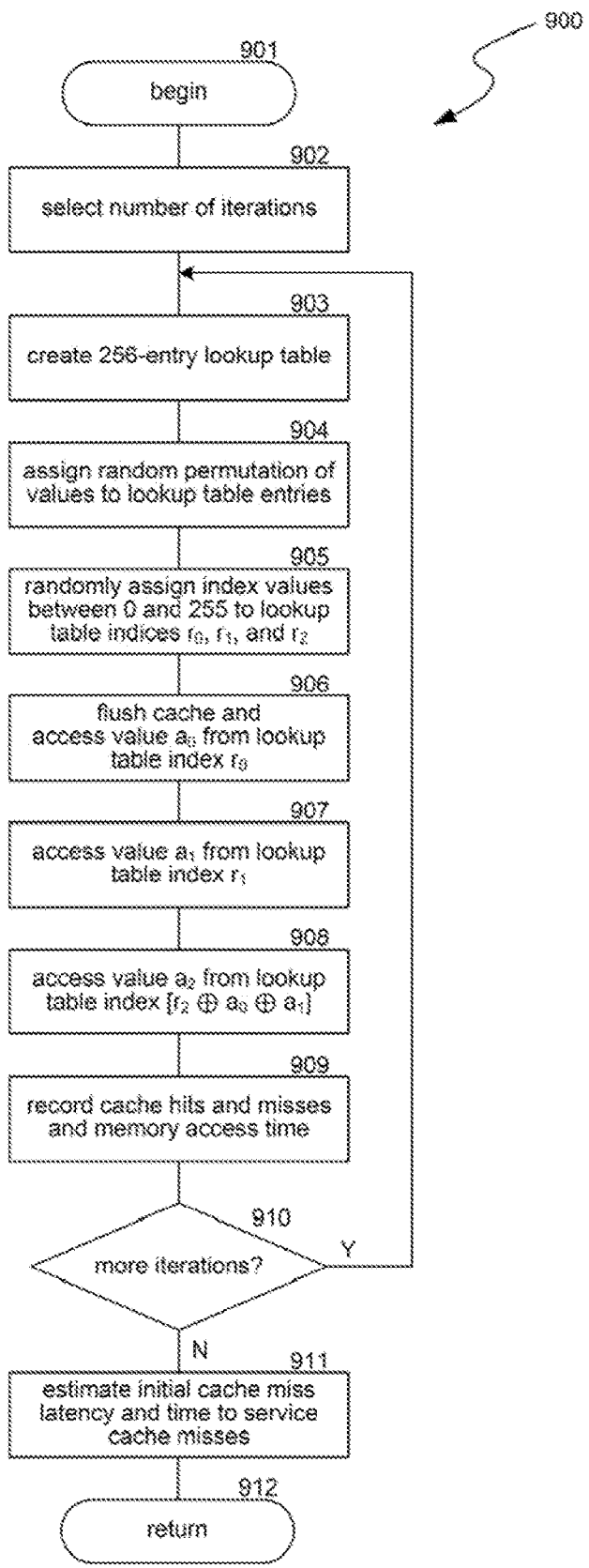
FIG. 9 is a flow diagram illustrating a routine performed by some embodiments of the technology to characterize latency for a first cache miss and time required to service cache misses on a processor architecture.

FIG. 9 is a flow diagram illustrating a routine 900 performed by some embodiments of the technology to characterize latency for a first cache miss and time required to service cache misses on a processor architecture. The routine 900 begins at block 901. The routine 900 continues at block 902, where it selects a number of iterations and begins a number of repetitions to accumulate data for estimating $\alpha$ and $\beta$ on the processor architecture. The routine 900 continues at block 903, where it creates a lookup table. In the illustrated embodiment, the routine 900 creates a 256-entry table of 8-bit values. The routine 900 continues at block 904, where it assigns a random permutation of the values from 0 to 255 into the lookup table, so that no two entries contain the same value.

The routine 900 continues at block 905, where it randomly assigns three lookup table indices $r_0$, $r_1$, and $r_2$. In the illustrated embodiment, the lookup table contains 256 entries, so the lookup table indices are three random numbers between 0 and 255. The routine 900 continues at block 906, where it flushes the cache to ensure more reliable measurements, and performs a lookup of the value at table index $r_0$, assigning the retrieved value to $a_0$. Because the table is not in the cache when the lookup is performed, this always results in a cache miss. The routine 900 continues at block 907, where it performs a lookup of the value at table index $r_1$, assigning the retrieved value to $a_1$. Depending on the values of $a_0$ and $a_1$, this lookup may result in a cache miss or a hit. Because the values of $a_0$ and $a_1$ are independent, micro-architectural processor cache acceleration features can be applied to these lookups, and the difference in timing between a miss and a hit gives an estimation of $\beta$.

The routine 900 continues at block 908, where it performs a lookup of the value at a table index determined by combining the values in $r_2$, $a_0$, and $a_1$ using exclusive-or $(r_2 \oplus a_0 \oplus a_1)$. Because this lookup depends on the results of the first two lookups, it generally cannot be accelerated. Thus, the difference in timing between a miss and a hit for this lookup gives an estimation of $\alpha+\beta$. The routine 900 continues at block 909, where it records the cache hits and misses and memory access time. The routine 900 continues at decision block 910, where it determines whether it should perform another iteration (repetition). If so, the routine 900 proceeds to the next repetition of blocks 903-909 until sufficient data has been gathered to characterize $\alpha$ and $\beta$ for the processor architecture at block 911 as described above. Otherwise, the routine 900 continues at block 912 where it returns.

In various embodiments, the technology uses other memory access sequences to determine estimates of $\alpha$ and $\beta$ for a particular processor architecture. In addition, a block cipher that utilizes T-tables may increase the effectiveness of micro-architectural processor cache acceleration features between rounds (e.g., allowing cache misses from one round to overlap with another), significantly reducing the value of a and the average time of a block cipher encryption operation. For example, a core of an E5606 Intel Xeon processor might have $(\alpha, \beta)$ values of (193, 7.5) for typical block ciphers, but (10, 7.5) for a block cipher utilizing a T-table. The technology accounts for the effects of different combinations of block cipher implementations and processor architectures to identify implementations with improved resistance to cache timing attacks.

Figure 10:
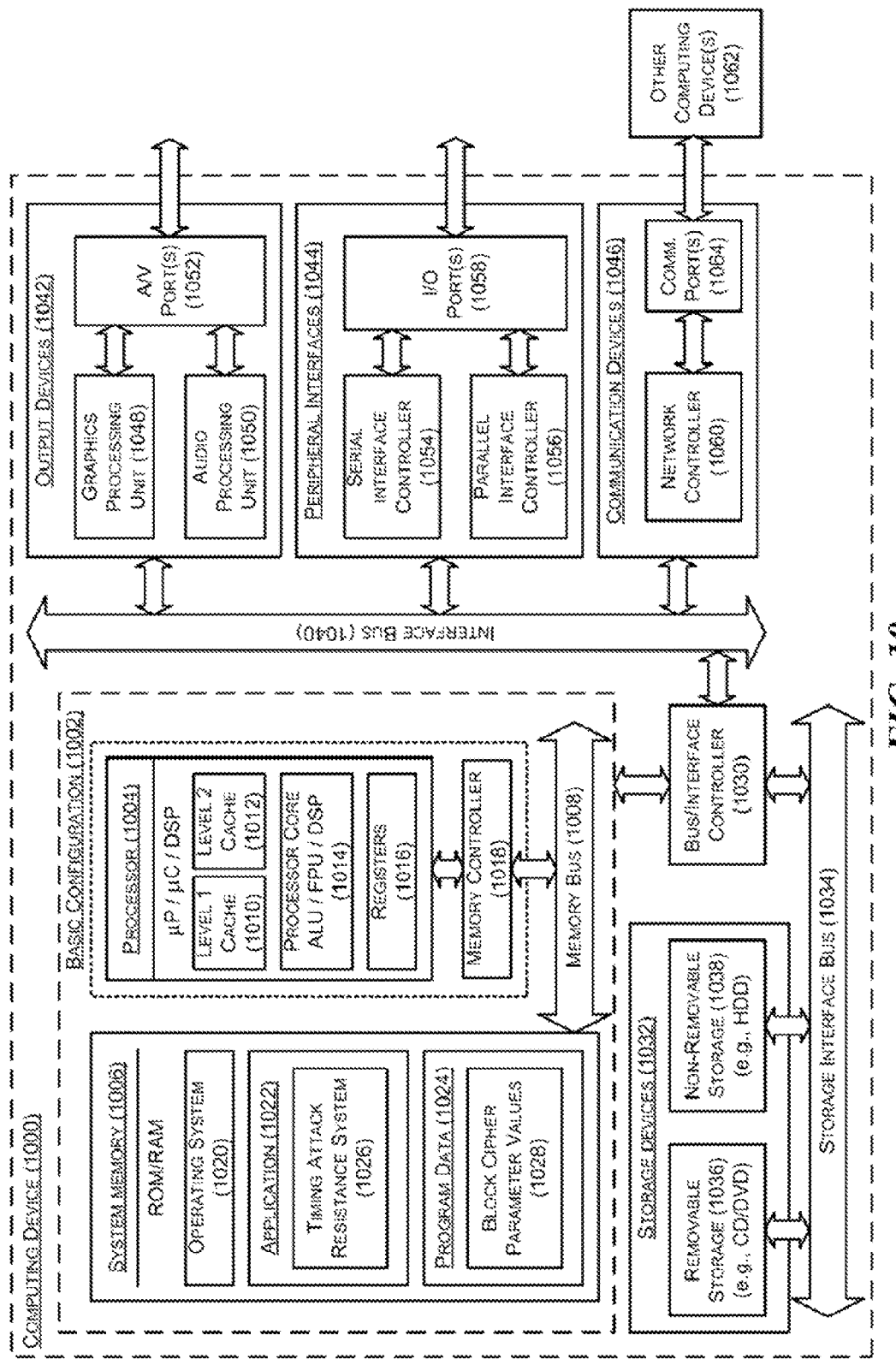
FIG. 10 is a block diagram illustrating an example computing device that is arranged in accordance with at least some embodiments of the present disclosure.

FIG. 10 is a block diagram illustrating an example computing device 1000 that is arranged in accordance with at least some embodiments of the present disclosure. In a very basic configuration 1002, the computing device 1000 typically includes one or more processors 1004 and a system memory 1006. A memory bus 1008 may be used for communicating between the processor 1004 and the system memory 1006.

Depending on the desired configuration, the processor 1004 may be of any type including but not limited to a microprocessor (µP), a microcontroller (µC), a digital signal processor (DSP), or any combination thereof. The processor 1004 may include one or more levels of caching, such as a level one cache 1010 and a level two cache 1012, a processor core 1014, and registers 1016. An example processor core 1014 may include an arithmetic logic unit (ALU), a floating point unit (FPU), a digital signal processing core (DSP core), or any combination thereof. An example memory controller 1018 may also be used with the processor 1004, or in some implementations, the memory controller 1018 may be an internal part of the processor 1004.

Depending on the desired configuration, the system memory 1006 may be of any type including but not limited to volatile memory (such as RAM), non-volatile memory (such as ROM, flash memory, etc.) or any combination thereof. The system memory 1006 may include an operating system 1020, one or more applications 1022, and program data 1024. An application 1022 may include a timing attack resistance system component 1026 that is arranged to evaluate the characteristics of the computing device and/or the resistance to timing attacks of block cipher encryption algorithm implementations on the computing device, as is described herein. The program data 1024 may include a block cipher parameter values data structure 1028, as is described herein. In some embodiments, the application 1022 may be arranged to operate with the program data 1024 on the operating system 1020 to support implementation of block cipher encryption algorithms that have improved resistance to cache timing attacks. This described basic configuration 1002 is illustrated in FIG. 10 by those components within the inner dashed line.

The computing device 1000 may have additional features or functionality, and additional interfaces to facilitate communications between the basic configuration 1002 and any required devices and interfaces. For example, a bus/interface controller 1030 may be used to facilitate communications between the basic configuration 1002 and one or more data storage devices 1032 via a storage interface bus 1034. The data storage devices 1032 may be removable storage devices 1036, non-removable storage devices 1038, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

The system memory 1006, removable storage devices 1036 and non-removable storage devices 1038 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1000. Any such computer storage media may be part of computing device 1000.

The computing device 1000 may also include an interface bus 1040 for facilitating communication from various interface devices (e.g., output devices 1042, peripheral interfaces 1044, and communication devices 1046) to the basic configuration 1002 via the bus/interface controller 1030. Example output devices 1042 include a graphics processing unit 1048 and an audio processing unit 1050, which may be configured to communicate to various external devices such as a display or speakers via one or more A/V ports 1052. Example peripheral interfaces 1044 include a serial interface controller 1054 or a parallel interface controller 1056, which may be configured to communicate with external devices such as input devices (e.g., a keyboard, a mouse, a pen, a voice input device, a touch input device, etc.) or other peripheral devices (e.g., a printer, a scanner, etc.) via one or more I/O ports 1058. An example communication device 1046 includes a network controller 1060, which may be arranged to facilitate communications with one or more other computing devices 1062 over a network communication link via one or more communication ports 1064.

The network communication link may be one example of communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media. The term computer readable storage media as used herein does not include communication media.

The computing device 1000 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 1000 may also be implemented as a personal computer including both laptop computer and non-laptop computer configurations.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a digital versatile disc (DVD), a digital tape, a computer memory, etc.: and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least." the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations." without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together. B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Although the subject matter has been described in language specific to structural features and/or methodological routines, it is to be understood that the subject matter defined in the appended claims is not necessarily limited to the specific features or routines described above. Rather, the specific features and routines described above are disclosed as example forms of implementing the claims. Accordingly, the invention is not limited except as by the appended claims.

The invention claimed is:

1. A computing system, comprising:
   a memory comprising executable instructions; and
   a processor that, in response to execution of the executable instructions, performs or controls performance of operations comprising:
   identify a processor architecture of the processor which will execute a block cipher, wherein the identification of the processor architecture comprises processor and cache information being obtained from at leak one of an operating system or a hypervisor;
   access a data structure that stores parameters and parameter values mapped to block cipher and processor architecture combinations, wherein the parameters include at least one of a number of tables used in a block cipher implementation, a number of iterations in the block cipher implementation, and at least one of a number of key-related lookups per table per iteration, a table size, a number of table elements that share a cache line; or an indication of whether a lookup table incorporates permutation as well as substitution, and wherein the data structure maps from the identified processor architecture to at least one block cipher encryption algorithm parameter value;
   determine the at least one block cipher encryption algorithm parameter value that maps to the identified processor architecture, wherein the at least one block cipher encryption algorithm parameter value is determined based on an execution time variance of a block cipher encryption algorithm on the identified processor architecture; and
   implement the block cipher encryption algorithm by use of the at least one block cipher encryption algorithm parameter value and an encryption key to venerate encrypted data, wherein the data structure maps from the identified processor architecture to the at least one block cipher encryption algorithm parameter value such that the implementation of the block cipher encryption algorithm by the use of the at least one block cipher encryption algorithm parameter value reduces an effectiveness of cryptanalytic cache timing attacks against the implementation of the block cipher encryption algorithm.

2. The computing system of claim 1, wherein the data structure comprises multiple implementations of the block cipher and processor architecture combinations with varying parameter values.

3. The computing system of claim 1, wherein the operations to identify the processor architecture include at least one operation to determine operational characteristics of the processor architecture.

4. The computing system of claim 3, wherein the operations to determine the operational characteristics of the processor architecture include at least one operation to characterize latency for a cache miss and a time to service the cache miss.

5. The computing system of claim 4, wherein the at least one operation to characterize the latency for the cache miss and the time to service the cache miss include at least one operation to conduct benchmark measurements.

6. The computing system of claim 1, wherein the operations further comprise:
   populate the data structure by creation of multiple encryption algorithm implementations and measurement of execution times for each of the multiple encryption algorithm implementations.

7. The computing system of claim 1, wherein the operations further comprise:
   populate the data structure by creation of multiple encryption algorithm implementations and measurement of average execution times for each of the multiple encryption algorithm implementations while under a cache timing attack.

8. A method, comprising:
   identifying a processor architecture of a processor of a computing system that will execute a block cipher, wherein identifying the processor architecture comprises obtaining processor and cache information from at least one of an operating system or a hypervisor;
   accessing a data structure that stores parameters and parameter values mapped to block cipher and processor architecture combinations, wherein the parameters include at least one of a number of tables used in a block cipher implementation, a number of iterations in the block cipher implementation, and at least one of a number of key-related lookups per table per iteration, a table size, a number of table elements that share a cache line, or an indication of whether a lookup table incorporates permutation as well as substitution, and wherein the data structure maps from the identified processor architecture to at least one block cipher encryption algorithm parameter value;
   determining the at least one block cipher encryption algorithm parameter value that maps to the identified processor architecture, wherein the at least one block cipher encryption algorithm parameter value is determined based on an execution time variance associated with a block cipher encryption algorithm on the identified processor architecture; and
   implementing the block cipher encryption algorithm by use of the at least one block cipher encryption algorithm parameter value and an encryption key to generate encrypted data, wherein the data structure maps from the identified processor architecture to the at least one block cipher encryption algorithm parameter value such that the implementation of the block cipher encryption algorithm by use of the at least one block cipher encryption algorithm parameter value reduces an effectiveness of cryptanalytic cache timing attacks against the implementation of the block cipher encryption algorithm.

9. The method of claim 8, wherein implementing the block cipher encryption algorithm by use of the at least one block cipher encryption algorithm parameter value comprises implementing the block cipher encryption algorithm by use of a plurality of block cipher encryption algorithm parameter values mapped to the identified processor architecture.

10. The method of claim 8, wherein accessing the data structure comprises accessing processor and cache information for the identified processor architecture.

11. The method of claim 8, further comprising populating the data structure by timing a plurality of cache access operations executed by the computing system.

12. A non-transitory computer readable medium having stored thereon processor-executable instructions that, in response to execution by a processor, causes the processor to perform or control performance of operations that comprise:
  identify a processor architecture of the processor which will execute a block cipher, wherein the identification of the processor architecture comprises processor and cache information being obtained from at least one of an operating system or a hypervisor;
  access a data structure that stores parameters and parameter values mapped to block cipher and processor architecture combinations, wherein the parameters include at least one of a number of tables used in a block cipher implementation, a number of iterations in the block cipher implementation, and at least one of a number of key-related lookups per table per iteration, a table size, a number of table elements that share a cache line, or an indication of whether a lookup table incorporates permutation as well as substitution, and wherein the data structure maps from the identified processor architecture to at least one block cipher encryption algorithm parameter value;
  determine the at least one block cipher encryption algorithm parameter value that maps to the identified processor architecture, wherein the at least one block cipher encryption algorithm parameter value is determined based on an execution time variance of a block cipher encryption algorithm on the identified processor architecture; and
  implement the block cipher encryption algorithm by use of the block cipher encryption algorithm parameter value and an encryption key to generate encrypted data, wherein the data structure maps from the identified processor architecture to the at least one block cipher encryption algorithm parameter value such that the implementation of the block cipher encryption algorithm by the use of the block cipher encryption algorithm parameter value reduces an effectiveness of cryptanalytic cache timing attacks against the implementation of the block cipher encryption algorithm.

13. The non-transitory computer readable medium of claim 12, wherein the operations further comprise at least one operation to:
  conduct benchmark measurements by timing three or more cache access operations.

14. The non-transitory computer readable medium of claim 12, wherein the data structure that maps from the identified processor architecture to the at least one block cipher encryption algorithm parameter value comprises processor and cache information.

15. The non-transitory computer readable medium of claim 12, wherein the data structure that maps from the identified processor architecture to the at least one block cipher encryption algorithm parameter value comprises information about operational characteristics of the identified processor architecture of the processor.

16. The non-transitory computer readable medium of claim 15, wherein the information about the operational characteristics of the identified processor architecture comprises information that characterizes latency for a cache miss and a time to service the cache miss.

17. The non-transitory computer readable medium of claim 12, wherein the operations further comprise at least one operation to:
  populate the data structure based on time differences between execution times of a computing system that executes at least two block cipher encryption algorithms.

* * * * *

UNITED STATES PATENT AND TRADEMARK OFFICE
CERTIFICATE OF CORRECTION

PATENT NO. : 9,813,235 B2
APPLICATION NO. : 14/350044
DATED : November 7, 2017
INVENTOR(S) : Mukhopadhyay et al.

Page 1 of 2

It is certified that error appears in the above-identified patent and that said Letters Patent is hereby corrected as shown below:

On the Title Page

In Item (57), under "ABSTRACT", in Column 2, Lines 9-10, delete "implementations subjecting" and insert -- implementations; subjecting --, therefor.

In the Specification

In Column 1, Line 8, delete "35 U.S.C. 371" and insert -- 35 U.S.C. §371 --, therefor.

In Column 1, Line 10, delete "35 U.S.C. 119(a)" and insert -- 35 U.S.C. §119(a) --, therefor.

In Column 1, Line 24, delete "(AES)." and insert -- (AES), --, therefor.

In Column 4, Line 17, delete "$(p_a \oplus k_n)$ where p$_a$" and insert -- $(p_n \oplus k_n)$ where p$_n$ --, therefor.

In Column 4, Line 21, delete "$(p_a \oplus p_b >=< k_a \oplus k_b >,$" and insert -- $< p_a \oplus p_b >=< k_a \oplus k_b >$, --, therefor.

In Column 7, Line 6, delete "the of tables" and insert -- the ω tables --, therefor.

In Column 7, Line 44, delete "$(p_b \oplus k_b)$" and insert -- $(p_n \oplus k_n)$ --, therefor.

In Column 9, Line 55, delete "SA." and insert -- 5A. --, therefor.

In Column 10, Line 50, delete "$< p_a \oplus p_b) =< k_a \oplus k_b >$" and insert -- $< p_a \oplus p_b >=< k_a \oplus k_b >$, --, therefor.

In Column 11, Line 13, delete "identities" and insert -- identifies --, therefor.

Signed and Sealed this
Seventh Day of August, 2018

Andrei Iancu
*Director of the United States Patent and Trademark Office*

CERTIFICATE OF CORRECTION (continued)
U.S. Pat. No. 9,813,235 B2

In Column 11, Line 46, delete "fi, the" and insert -- β, the --, therefor.

In Column 11, Line 48, delete "a, the" and insert -- α, the --, therefor.

In Column 12, Line 37, delete "a and" and insert -- α and --, therefor.

In Column 15, Line 21, delete "etc.:" and insert -- etc.; --, therefor.

In Column 16, Line 15, delete "least." the" and insert -- least," the --, therefor.

In Column 16, Lines 38-39, delete "recitations." without" and insert -- recitations," without --, therefor.

In Column 16, Line 54, delete "together. B" and insert -- together, B --, therefor.

In the Claims

In Column 17, Line 38, in Claim 1, delete "leak" and insert -- least --, therefor.

In Column 17, Line 47, in Claim 1, delete "line; or" and insert -- line, or --, therefor.

In Column 17, Line 63, in Claim 1, delete "venerate" and insert -- generate --, therefor.